March 2 1943. W. R. TUCKER 2,312,941
ROTARY VALVE
Filed July 30, 1941 4 Sheets-Sheet 1
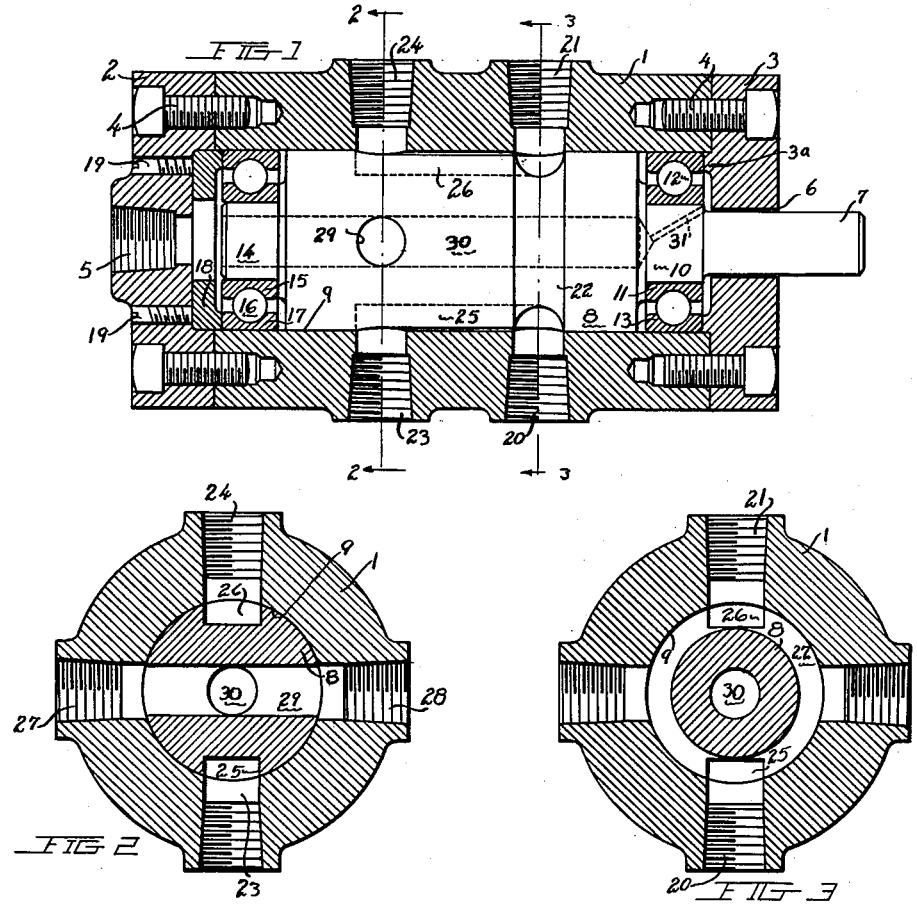
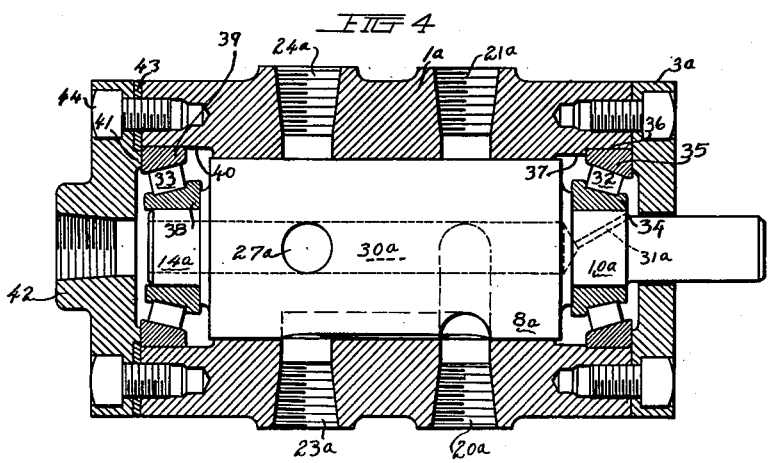
INVENTOR
WARREN R. TUCKER
By
ATTORNEYS

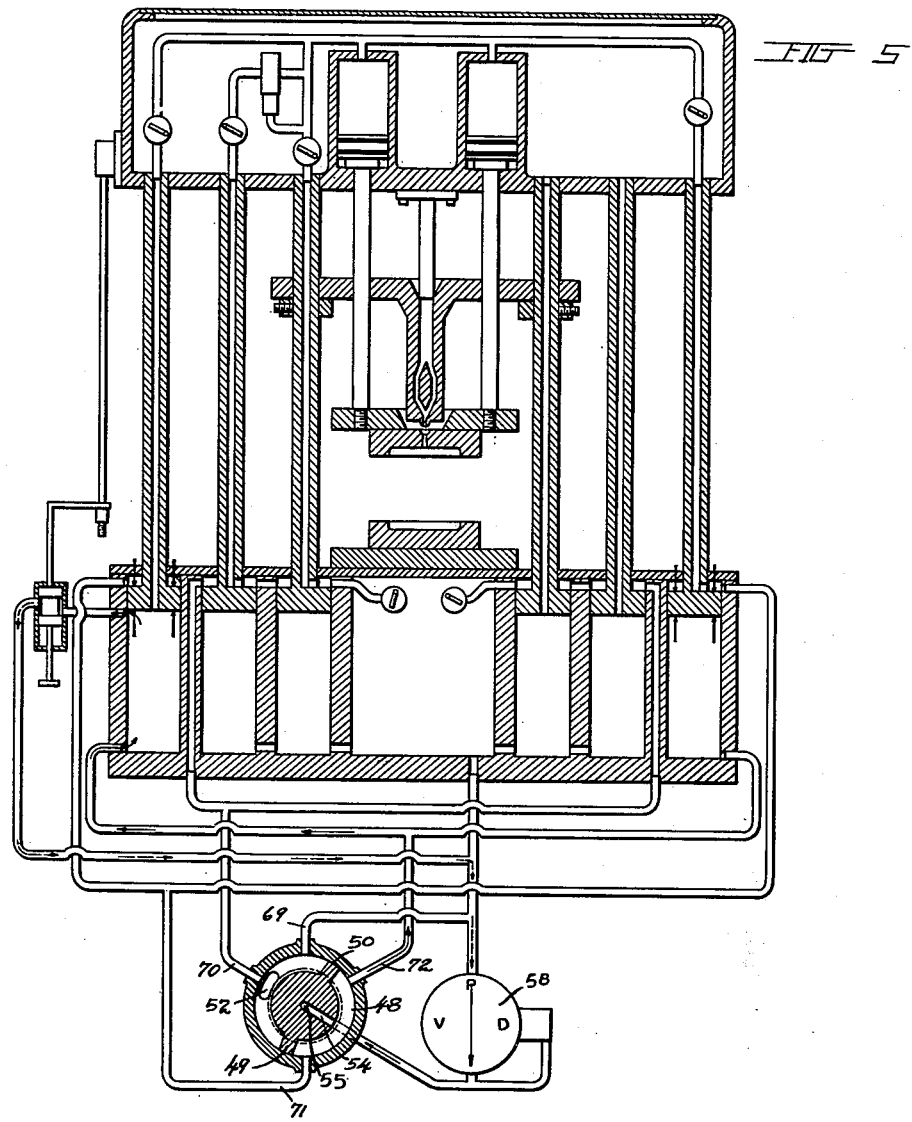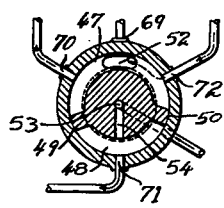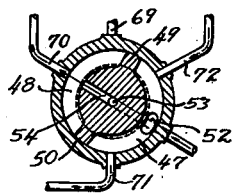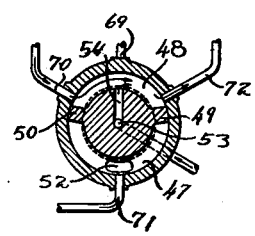

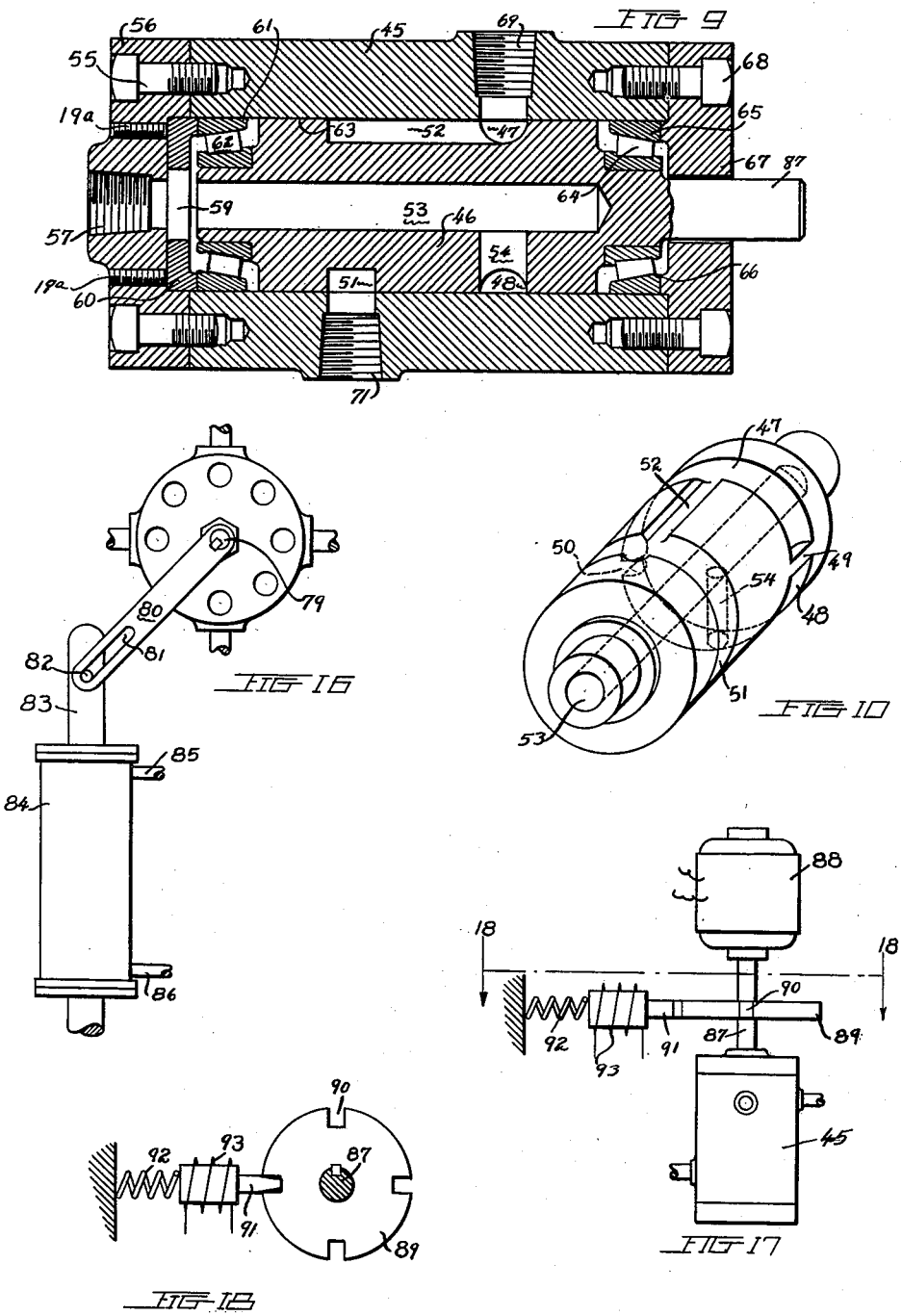

March 2 1943.                W. R. TUCKER                2,312,941
                              ROTARY VALVE
                           Filed July 30, 1941              4 Sheets—Sheet 4
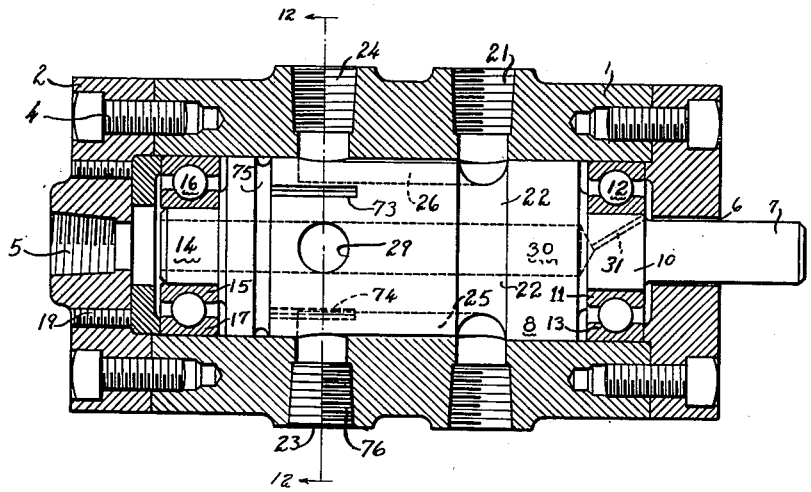
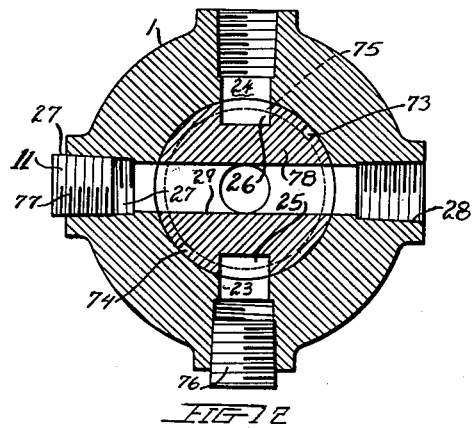
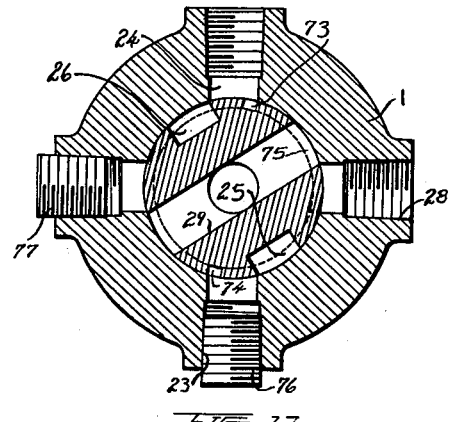
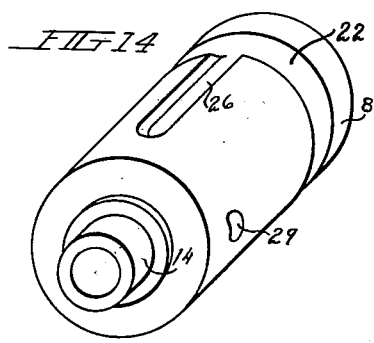
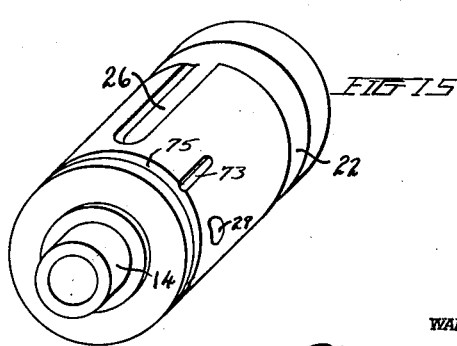
INVENTOR
WARREN R. TUCKER
ATTORNEYS Patented Mar. 2, 1943

2,312,941

UNITED STATES PATENT OFFICE 2,312,941

ROTARY VALVE

Warren R. Tucker, Dayton, Ohio, assignor to The Hydraulic Development Corporation, Inc., Wilmington, Del., a corporation of Delaware Application July 30, 1941, Serial No. 404,683

5 Claims. (Cl. 251—98)

This invention relates to valves and, in particular, to rotary valves.

With rotary valves heretofore known, difficulties have been encountered to move such valves when under high hydraulic pressure. The reason therefor is believed to lie in the difficulty to make the rotor and the bore therefor perfectly parallel. In other words, it is practically impossible to provide exactly the same clearance all around the valve rotor so that, during the operation of the valve, fluid is wedged in on one side of the valve rotor and squeezed out on the opposite side of said rotor with the result that the valve rotor assumes an eccentric position.

In cases where the valve rotor is subjected to one-sided pressure, the rotor is naturally pushed to one side and the situation described above is even worse. While the last mentioned difficulty has, at least in part, been remedied by the provision of a groove, or the like, around the rotor in an effort to equalize the fluid pressure on opposite surfaces of the rotor, the drawback caused by the impossibility to make the rotor surface perfectly parallel to the surface of the valve bore therefor remained, and caused serious difficulties in high pressure hydraulic systems, which made it necessary to use increased force for shifting the valves, and to make the valves relatively heavy in order to enable them to withstand the said increased force and wear.

Accordingly, it is an object of the invention to provide an improved rotary valve which will be operable without employing undue force, and thereby enable a lighter construction.

It is another object to provide a rotary valve which, even when under one-sided high pressure, will allow of an easy shifting movement of the valve rotor.

A further object of the invention consists in the provision of a rotary valve in which the sealing or valving surfaces of the rotor are separated from the bearing surfaces of the rotor.

It is still another object of the invention to provide a rotary valve in which the position of the rotor axis with regard to the axis of the valve bore may be adjusted to vary the location of the rotor within the valve bore so as to equalize the clearance around the rotor as far as possible.

These and other objects and advantages of the invention will appear more clearly from the following specification in connection with the accompanying drawings, in which:

Figure 1 shows a section through a first embodiment of a rotary valve according to the invention.

Figure 2 is a section along the line 2—2 of Figure 1.

Figure 3 is a section along the line 3—3 of Figure 1.

Figure 4 illustrates in section a second embodiment of the invention, showing a rotary valve with a hydraulically unbalanced rotor.

Figure 5 shows a hydraulic press with an unbalanced valve.

Figures 6, 7 and 8 illustrate different positions of the unbalanced rotary valve of Figure 5.

Figure 9 is a longitudinal section through the valve shown in Figures 5 to 8.

Figure 10 illustrates a perspective view of the rotor of Figure 9.

Figure 11 is a section through a further embodiment of the invention.

Figure 12 is a section along the line 12—12 of Figure 11.

Figure 13 is a section similar to that of Figure 12, but with the rotor in a different position.

Figure 14 is a perspective view of the rotor of Figure 1.

Figure 15 is a perspective view of the rotor of Figure 11.

Figure 16 shows actuating means for a valve according to the invention.

Figure 17 shows another embodiment of actuating means for a valve according to the invention.

Figure 18 is a section along the line 18—18 of Figure 17.

General arrangement

The rotary member of the rotary valve according to the invention is, in contradistinction to the rotary valves heretofore known, not supported by the adjacent wall portion of the stationary valve member, but by accurate anti-friction bearings. In other words, with the valve according to the invention, the sealing or valving surfaces of the rotary valve member are separated from the bearing surfaces of the rotor, which bearing surfaces are supported by anti-friction bearings maintaining the sealing or valving surfaces of the rotary valve properly spaced from the adjacent wall portions of the stationary valve member.

According to a further embodiment of the invention, the anti-friction bearings are associated with adjusting means adapted to adjust the anti-friction bearings, thereby varying the location of the rotary valve member relative to the stationary valve member.

Structural arrangement

Referring now to the drawings in detail, the valve member shown in Figure 1 comprises a stationary valve casing 1 with end members 2 and 3 connected to the casing 1 in any convenient manner, for instance, by screws 4. The end member 2 is provided with a threaded bore 5 adapted to receive a pipe or hose connection, whereas the end member 3 is provided with a bore 6 through which passes the shaft 7 of the rotary valve member 8 which is rotatable within the bore 9 of the stationary valve casing 1.

The shaft 7 is provided with an enlarged portion 10 mounted in the inner race 11 of a ball bearing 12, the outer race 13 of which is mounted in the bore 9 of the stationary valve casing 1 and engaged by an annular portion 3a of the end member 3. Similarly, the opposite end of the rotary valve member 8 is provided with a shaft portion 14 mounted in the inner race 15 of the ball bearing 16, the outer race 17 of which is located in the bore 9 of the stationary casing 1 and engaged by an adjusting member 18 adapted to be pressed against the outer race 17 by means of screws 19 passing through the end member 2.

The stationary casing 1 comprises two oppositely located bores or ports 20 and 21, which are in continuous communication with an annular groove 22 in the rotary valve member 8 and are provided with a thread for receiving hose or pipe connections. The stationary casing 1 furthermore comprises a threaded bore or port 23 and a further oppositely located threaded bore or port 24. Communicating with the annular groove 22 are two oppositely located channels 25 and 26 which are adapted to communicate with the ports 23 and 24 respectively when the rotary valve member 8 occupies the position shown in Figure 1.

Substantially rectangular to the ports 23 and 24 are threaded ports 27 and 28 in the casing 1 which are adapted to be connected with each other by a bore 29, passing through the rotary valve member 8, when the rotary valve member occupies the position shown in Figures 1 and 2.

Passing through the rotary valve member 8, in longitudinal direction thereof, is a bore 30, one end of which leads into the space between the ball bearing 16 and the adjusting member 18, whereas the other end of the bore 30 communicates through a channel 31 with the space between the end member 3 and the ball bearing 12. When the bore 30 and the bore 29, communicating therewith, are connected to an exhaust, the channel 31 serves to collect leakage passing past the ball bearing 12, whereas when the bore 30 is connected to the pressure side, the channel 31 will serve to equalize the pressure axially acting upon the rotary valve member 8.

The valve shown in Figure 1 constitutes a balanced four-way valve which, in the position shown in Figure 1, establishes connection between the ports 20 and 23 on one hand, and the ports 21 and 24 on the other hand, whereas the port 27 communicates with the port 28 and, through bore 30, with the bore 5. If desired, one of the ports 20, 23 and one of the ports 21, 24 may be plugged, the two extra ports merely being for convenience. When the rotary valve member 8 is rotated by 90 degrees, the bore 29 will establish communication between the ports 23 and 24, while the ports 27 and 28 will communicate, through channels 26 and 25 respectively, and groove 22, with the ports 20 and 21.

The vital feature of the valve shown in Figures 1 to 3 is the suspension of the valve rotor in the close fitting anti-friction bearings 12 and 16. Because of this feature, the surge of fluid through the valve is prevented from forcing the rotor against one wall of the bore in the casing 1, so that the rotor is maintained frictionally free. Since the rotary valve member 8 is hydraulically balanced, due to the provision of the annular groove 22, it is quite sufficient to provide ball bearings at the end of the rotary valve member 8 for supporting and maintaining the rotary valve member in proper position. However, if an unbalanced rotary valve member is provided, the valve is preferably constructed in the manner shown in Figure 4.

The valve of Figure 4 substantially corresponds to that of Figure 1 and similar parts have been designated with the same reference numerals, however, with the additional letter a. The valve of Figure 4, aside from being unbalanced, differs from the valve of Figure 1 primarily in that the rotary valve member 8a is supported at its shaft portions 10a and 14a by tapered roller bearings 32 and 33.

The inner race 34 of the roller bearing 32 is mounted on the shaft portion 10a, whereas the outer race 35 of the roller bearing 32 is mounted in the bore 36 and clamped against the annular shoulder 37 by means of the end member 3a. The inner race 38 of the tapered roller bearing 33 is mounted on the shaft portion 14a, whereas the outer race 39 of the bearing 33 is slidably mounted in the bore 40 of the casing 1a. The outer race 39 of the bearing 33 is engaged by an annular portion 41 of the end member 42 for adjusting the bearing 33, and the extent of adjustment is determined by the thickness of the shim or shims 43 interposed between the left end side of the casing 1a and the end member 42, connected to the casing by means of screws 44.

As will be clear from the drawings, the adjustment of the tapered roller bearing 33 also adjusts the tapered roller bearing 32 and, thereby, enables an adjustment of the rotary valve member 8a and its axis relative to the axis of the valve casing 1a so that the clearance between the sealing or valving surface of the rotary valve member 8a and the adjacent wall portion of the casing 1a may be equalized as far as possible. It will also be noted that the surface of the casing 1a engaged by the outer races 35 and 39 of the tapered roller bearings 32 and 33 is separated from the wall portion of the casing 1a cooperating with the adjacent surface of the rotary valve member 8a so that only a small portion of the casing is to be machined for a close fit of the tapered bearings 32, 33.

The tapered bearings 32 and 33 take up all radial forces exerted by the pressure fluid and tending to dislocate the axis of the rotary valve member with regard to the axis of the casing and prevent any such dislocation. Since, on the other hand, the rotary valve member 8a is journalled in tapered anti-friction bearings, the rotary valve member can easily be shifted in spite of the hydraulic forces exerting one-sided pressure on the rotary valve member 8a.

Another unbalanced valve is shown in Figure 9 which may be used in connection with the press of Figure 5. The said press does not form a part of the present invention, and for a more detailed description thereof reference may be had to U. S. Patent application, Serial No. 330,868, filed April 22, 1940, by Warren R. Tucker.

The valve of Figures 6 to 9 comprises a valve casing 45 having rotatably mounted therein a rotary valve member 46, which latter has two half circular recesses 47 and 48 separated from each other by ribs 49 and 50. The rotary valve member 46 furthermore comprises an annular recess 51 which communicates through a channel 52 with the recess 47. The rotary valve member 46 has a longitudinal bore 53 which communicates through a passageway 54 with the recess 48.

Connected to the left side of the valve casing 45, by means of screws 55, is an end member 56 with a port 57 which, in Figures 5 to 8, is connected to the pressure side of the pump 58. The port 57 is in hydraulic communication with the bore 53 through an opening 59 provided in the adjusting pad 60 which engages the outer race 61 of a tapered roller bearing 62, and is adjustable by screws 18a. The roller bearing 62 is mounted in the bore 63 of the casing 45 and supports one end of the rotary valve member 46. The other end of the valve member 46 is supported by a tapered roller bearing 64, the outer race 65 of which is also mounted in the bore 63 of the casing 45. The outer race 65 is engaged by an annular portion 66 of the end member 67 connected to the casing 45 by screws 68. The valve casing 45 has four ports 69, 70, 71 and 72.

As will be seen from the drawings, the valve of Figure 9, in addition to being radially unbalanced, is also axially unbalanced. However, the tapered roller bearings 62 and 64 take up axial as well as radial thrusts and, thereby, prevent the pressure fluid in the valve from moving the rotary valve member radially and axially with regard to the axis of the valve casing 45. The rotary valve member remains, therefore, properly located and, at any time, can be shifted from one position into another position without requiring undue forces and exerting undue wear upon the rotary valve member and the valve casing.

The valve illustrated in Figure 11 constitutes a further improvement with regard to hydraulically balancing the rotary valve member. The valve of Figure 11 corresponds substantially to that of Figure 1, but differs therefrom by the provision of peripheral channels 73 and 74.

It has been found that the rotary valve member of Figures 1 and 3 becomes hydraulically unbalanced when the port 24 is connected to a pressure line, while the ports 23 and 27 are plugged, and the rotary valve member is shifted from its Figure 2 position into neutral position, i. e., into a position where the bore 29 occupies a position intermediate the ports 24 and 28. The reason therefor is that, although at the time of said shifting operation the fluid pressure in the port 24 equals the pressure of the fluid entrapped between the now shifted rotary valve member and the port 23, fluid leaks out from the port 23, thereby causing a decrease in pressure of the pressure fluid entrapped in the port 23. Consequently, the pressure in port 24, which as mentioned is connected to a pressure line, tends to axially offset the rotary valve member, and would actually do so if it were not for the anti-friction bearings provided according to the invention for supporting the rotary valve member.

However, since the elimination of this one-sided pressure on the rotary valve member, in neutral position of the latter, will make it possible to properly support the rotary valve member by even lighter anti-friction bearings, the rotary valve member has, according to Figure 11, been provided with peripheral slots or channels 73, 74 being, on one end thereof, in communication with an annular groove 75.

Referring now to Figures 12 and 13 in which the ports 23 and 27 are closed toward the outside by plugs 76 and 77, and assuming that the rotary valve member has been shifted from Figure 12 position to Figure 13 position, it will be noted that the channels 73 and 74 are so located that they communicate with the ports 23 and 24. Consequently, fluid pressure is continuously conveyed from the port 24, which is assumed to be connected with a pressure line, to port 23 through channel 73, groove 75 and channel 74. Therefore, the pressure in ports 23 and 24 is equalized and, no matter how long the valve will be held in Figure 13 position, will stay equalized, thereby maintaining the rotary valve member hydraulically balanced.

Since, thus, the rotary valve member is at any time hydraulically balanced as far as the accurateness of the machining process of the rotary valve member and the valve casing allows, light anti-friction bearings will be able, at all times and in all possible conditions, to assure a proper and easy operation of the rotary valve member.

The rotary valve member of the various embodiments shown in the drawings may be operated manually by a handle keyed or otherwise connected thereto, but, if desired, also mechanical or fluid operating mechanisms may be provided. For instance, according to Figure 16, the shaft 79 of the rotary valve member has keyed thereto an arm 80 with a slot 81 in which is slidably movable a pin 82 connected to a plunger 83 reciprocably mounted in a cylinder 84.

The cylinder 84 has connected thereto two pipe lines 85 and 86 which are connected by means of a two-way valve (not shown) with a fluid pressure source so that the plunger 83 may selectively be moved in one or the other direction, thereby shifting the valve shaft 79 accordingly.

According to the embodiment of Figure 17, which is intended for actuation of a valve to be rotated in one direction only as, for instance, the valve shown in Figures 6 to 9, the shaft 87 of the rotary valve member is connected with a stall motor 88. Keyed to the shaft 87 is a disc 89 with a plurality of notches 90 corresponding in number to the possible different positions of the valve. The notches 90 are adapted sequentially to be engaged by a tongue or stop member 91 which is continuously urged by a spring 92 into engagement with the disc 89 and is adapted to be withdrawn therefrom by energization of the solenoid 93.

While the valve according to the invention has been shown in the drawings with a stationary casing housing the rotary valve member, it is, of course, understood that also the reverse arrangement may be adapted in which the casing is rotatable while the valve shaft or valve member is stationary.

It will be understood that I desire to comprehend within my invention such modifications as come within the scope of the claims and the invention.

Having thus fully described my invention, what I claim as new and desire to secure by Letters Patent, is:

1. A rotary valve comprising in combination a stationary valve member having at least three ports therein, a rotatable valve member with a plurality of passages for cooperation with said ports, said passages being so arranged as to hydraulically balance said rotatable valve member against thrust due to pressures in two of said ports in all positions of the rotatable valve member, and additional passages arranged to balance the valve member against thrust due to pressure in a third one of said ports when out of communication with the others of said ports.

2. A rotary valve comprising in combination a stationary valve member having at least three ports therein, a rotatable valve member with a plurality of passages for cooperation with said ports, said passages being so arranged as to hydraulically balance said rotatable valve member against thrust due to pressures in two of said ports in all positions of the rotatable valve member, anti-friction bearings interposed between said stationary and said rotatable valve member for supporting the latter, and additional passages arranged to balance the valve member against thrust due to pressure in a third one of said ports when out of communication with the others of said ports.

3. A rotatable valve comprising in combination a stationary valve member having a plurality of ports therein including supply, exhaust and one or more service ports, a rotatable valve member with a plurality of passages for cooperation with said ports, said passages being so arranged as to hydraulically balance said rotatable valve member against thrust due to pressures in said supply and exhaust ports in all positions of the valve member, and additional passage means arranged to balance the valve member against thrust due to pressure in one service port when said service port is out of communication with the others of said ports.

4. A rotatable valve comprising in combination a stationary valve member having a plurality of ports therein including supply, exhaust and one or more service ports, a rotatable valve member with a plurality of passages for cooperation with said ports, said passages being so arranged as to hydraulically balance said rotatable valve member against thrust due to pressures in said supply and exhaust ports in all positions of the valve member, anti-friction bearings interposed between said stationary and said rotatable valve member for supporting the latter, and additional passage means arranged to balance the valve member against thrust due to pressure in one service port when said service port is out of communication with the others of said ports.

5. A rotatable valve comprising in combination a stationary valve member having a plurality of ports therein including supply, exhaust and one or more service ports, a rotatable valve member with a plurality of passages for cooperation with said ports, said passages being so arranged as to hydraulically balance said rotatable valve member against thrust due to pressures in said supply and exhaust ports in all positions of the valve member, anti-friction roller bearings interposed between said stationary and said rotatable valve member for supporting the latter, and additional passage means arranged to balance the valve member against thrust due to pressure in one service port when said service port is out of communication with the others of said ports.

WARREN R. TUCKER.